March 18, 1958

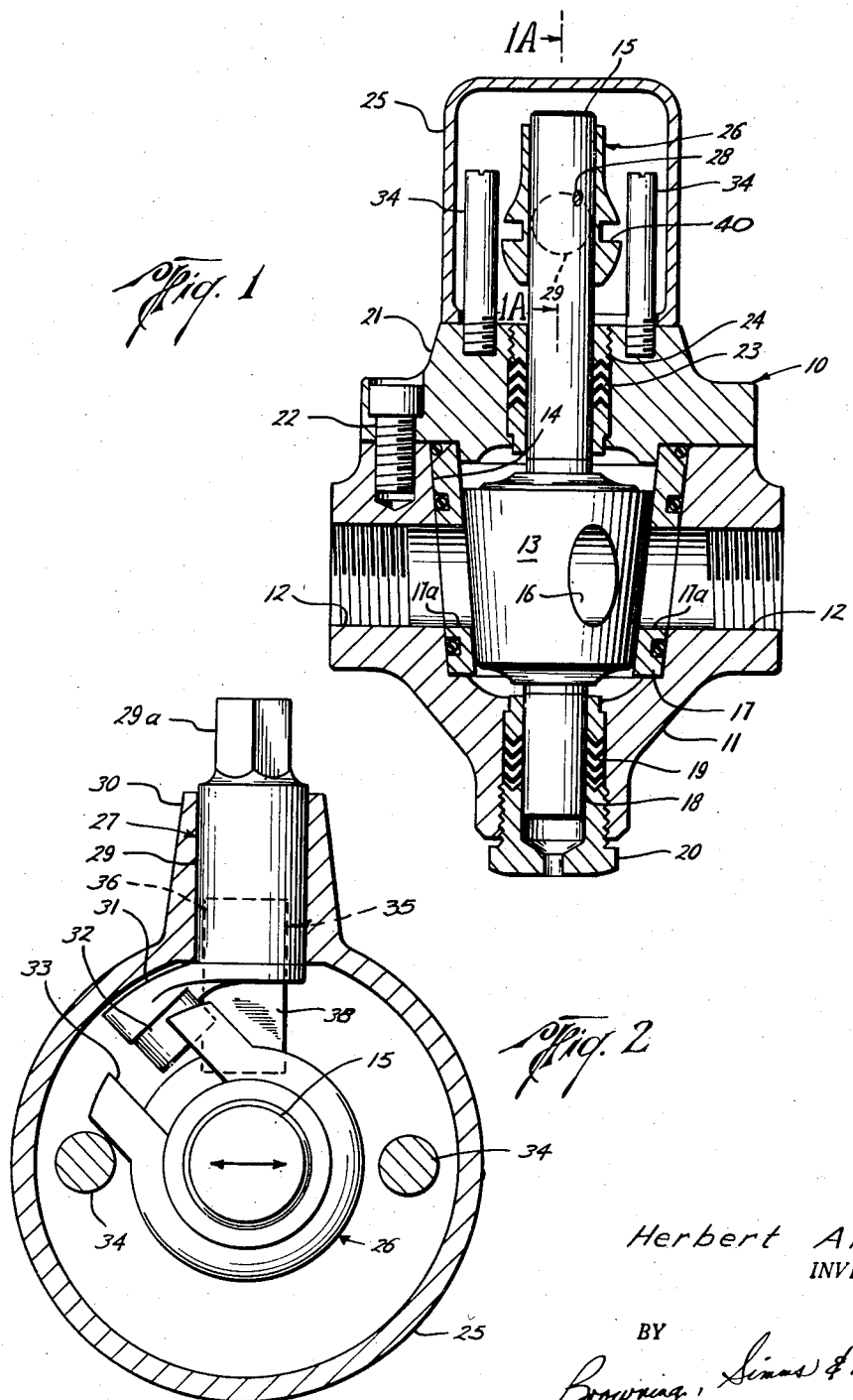

H. ALLEN 2,826,921

VALVE ACTUATOR MECHANISM

Filed Nov. 5, 1956

Herbert Allen
INVENTOR.

BY

ATTORNEYS

March 18, 1958 H. ALLEN 2,826,921
VALVE ACTUATOR MECHANISM
Filed Nov. 5, 1956 4 Sheets-Sheet 3

Herbert Allen
INVENTOR.

BY
Browning, Sease & Hyer
ATTORNEYS

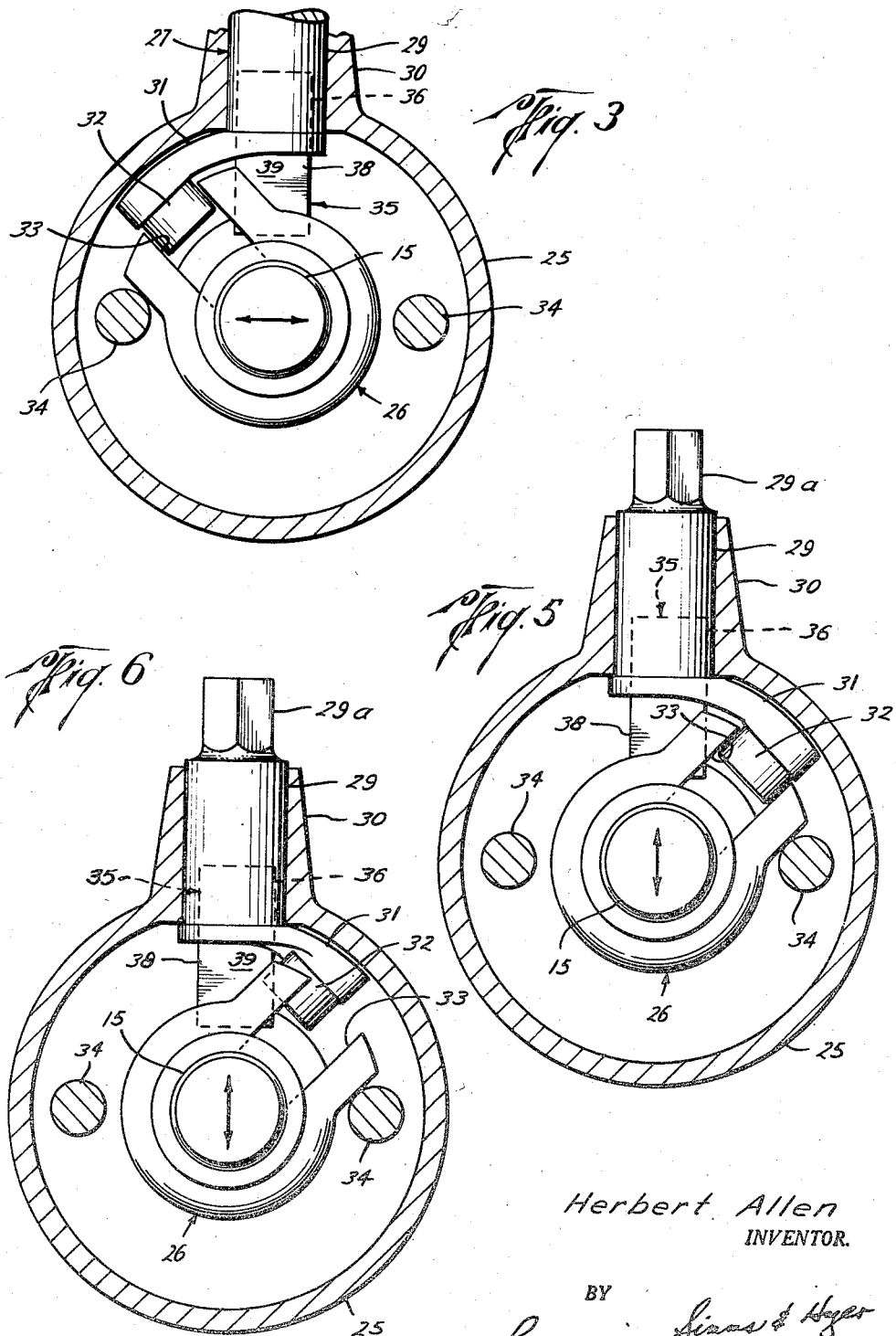

United States Patent Office 2,826,921
Patented Mar. 18, 1958

2,826,921

VALVE ACTUATOR MECHANISM

Herbert Allen, Houston, Tex., assignor to Cameron Iron Works, Inc., Houston, Tex.

Application November 5, 1956, Serial No. 620,446

13 Claims. (Cl. 74—22)

This invention relates to an improved actuator mechanism for causing rotation and limited endwise movement of a stem for a valve member or the like. More particularly, it relates to a novel mechanical connection between a rotatably mounted shaft and a stem mounted for rotation and limited endwise movement on a common axis intersecting the rotational axis of the shaft and disposed about 90° relative thereto.

The movement above-noted may be imparted to the stem of a rotary type valve member for moving the valve member axially between seated and unseated positions and rotating it between opened and closed positions. In an environment of this type, it is desired that the actuator mechanism for imparting such movement be effective to first lift the valve member from its seated position, then rotate it while further lifting and then lowering same, and finally to lower it into seated position. A mechanism particularly well suited for this and other purposes is shown in my Patent No. 2,715,838.

An object of this invention is to provide an actuator mechanism of the general character shown in my earlier patent, but in which cam and follower parts on the shaft and stem for moving the stem axially are interengageable with one another along flat surfaces so as to provide a large bearing area therebetween and a long wear life for such parts.

Another object is to provide an actuator mechanism of the general character shown in my earlier patent, but in which the cam and follower parts for imparting both axial as well as rotary movement to the stem are located on the same side of the stem.

A further object is to provide an improved actuator mechanism of this general type which does not require the reversing nuts or cam tracks on the valve body conventionally employed for imparting the desired movement to the valve member.

Other objects, advantages and features of this invention will be apparent to one skilled in the art upon a consideration of the written specification, the attached claims and the annexed drawings.

In the drawings, wherein like reference characters are used throughout to designate like parts:

Fig. 1 is a vertical sectional view of a valve having a rotary type valve member which is actuated by mechanism constructed in accordance with the present invention, and which is shown unseated intermediate its opened and closed positions;

Fig. 2 is a top plan view of the actuator mechanism when the valve member is seated and in its open position;

Figs. 3 and 3A are views corresponding to Figs. 2 and 2A, respectively, when the valve member is still open but unseated;

Figs. 5 and 5A are further corresponding views of the valve, when the valve member is still unseated but in a closed position;

Figs. 6 and 6A are still further corresponding views, but when the valve member is seated and closed.

Figure 6A:
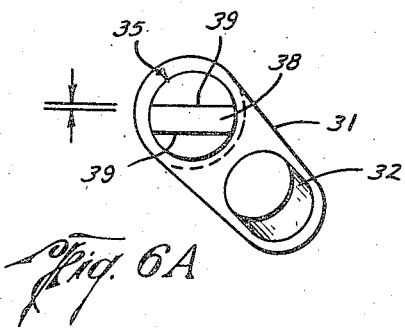

Referring now to Fig. 1 of the above described drawings, the illustrated valve 10 includes a valve body 11 having a passageway 12 therethrough which is adapted to be opened and closed by means of a rotary plug type valve member 13. Thus, the valve member 13 is received within an opening 14 in the body intersecting the passageway 12 for disposal across the passageway and rotation about the axis of its stem 15 between an open position (Fig. 2), in which a flow passage 16 therethrough is aligned with the valve body passageway 12, and a closed position (Fig. 6), in which such flow passage is disposed at 90° to the passageway 12. With reference to Figs. 2 and 6, it will be seen that the double-headed arrow at the top of the stem 15 indicates the direction of the flow passage 16 relative to the valve body. Received within the opening 14 of the valve body for seating the conically shaped valve member 13 is a liner 17 having openings 17a therethrough adapted to align with the passageway 12 and flow passage 16.

The valve member 13 is conically shaped and mounted within the valve body for axial as well as rotational movement. Thus, the stem 15 of the valve member is rotatably and sealably received through a packing 23 and nut 24 carried by a bonnet 21 which is bolted to the valve body as at 22 for closing the opening 14. The lower end of the valve member opposite the stem 15 is provided with an axially disposed extension 18 which is also rotatably and sealably received within a packing 19 and gland nut 20 mounted in the bottom of the valve body. The downward axial movement of the valve member is, of course, limited by seating of such member upon the liner 17.

The upper end of the stem 15 and the novel actuating mechanism of the present invention are enclosed within a cover 25 suitably secured to the bonnet. This mechanism comprises a cam part 27 carried by the cover in position for operative engagement with a follower part 26 which may be attached to the stem by means of a pin 28, or if desired, may be an integral part of the stem.

Figure 5A:
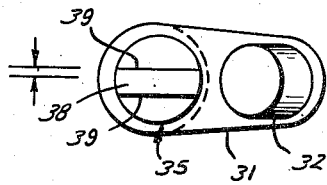
Figure 3A:
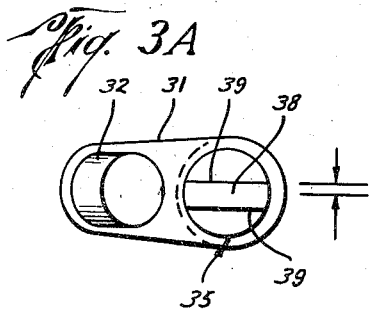

The cam part 27 comprises a shaft 29 received within a boss 30 of the cover for rotation about an axis intersecting and disposed at about 90° to the axis of rotation of the stem 15 of the valve member. The outer end of the shaft is provided with a wrench part 29a for actuation in a conventional manner. A crank arm 31 secured to the inner end of the shaft 29 and extending angularly with respect to the axis of rotation thereof is provided with a cylindrical knob 32 which is drivingly engageable between spaced apart and parallel cam surfaces 33 on the follower part 26. These surfaces 33 are extended upwardly a sufficient distance to confine the knob therebetween during rotation of the shaft 29 approximately 180° from the position of Figs. 3 and 3A to the position of Figs. 5 and 5A. More particularly, the knob 32 is carried by the crank arm for engagement with the surfaces 33 along lines intersecting the intersection of the axes of rotation of the shaft and stem and disposed at about 45° to the axis of rotation of the latter so that, upon such 180° of rotation of the shaft, the stem is rotated approximately 90° to move the valve member between opened and closed positions.

Obviously, the above-described rotation of the shaft represents the maximum amount of rotational movement which can be positively imparted to the stem and valve member. However, in order to prevent overtravel of the valve member due to its own momentum, posts 34 may be mounted within the enclosure of the cover 25 for engagement with the follower part 26 or the stem itself in the opposite extreme rotational positions of the stem.

Another crank member 35 is carried by the shaft 27 for engagement with the stem in a manner to move it endwise or axially in response to rotation of said shaft. This crank member is provided with a cylindrical pin 36 at its outer end which is received closely but freely within an opening 37 in the shaft 27 for rotation relatively thereto. More particularly, the axis of the opening 37 is parallel to but spaced from the axis of rotation of the shaft 27 so that the crank member 35 is caused to move vertically during rotation of the shaft 27. The inner end of the crank member 35 is recessed along its upper side to provide a ledge 38 having parallel flat surfaces 39 operatively engaged with complementary parallel cam surfaces in an annular slot 40 provided about the follower part 26. More particularly, the flat sides of the slot 40 are disposed perpendicularly to the axis of rotation of the stem so that movement of the crank member 35 vertically is operative to move the stem endwise or axially.

Figure 4:
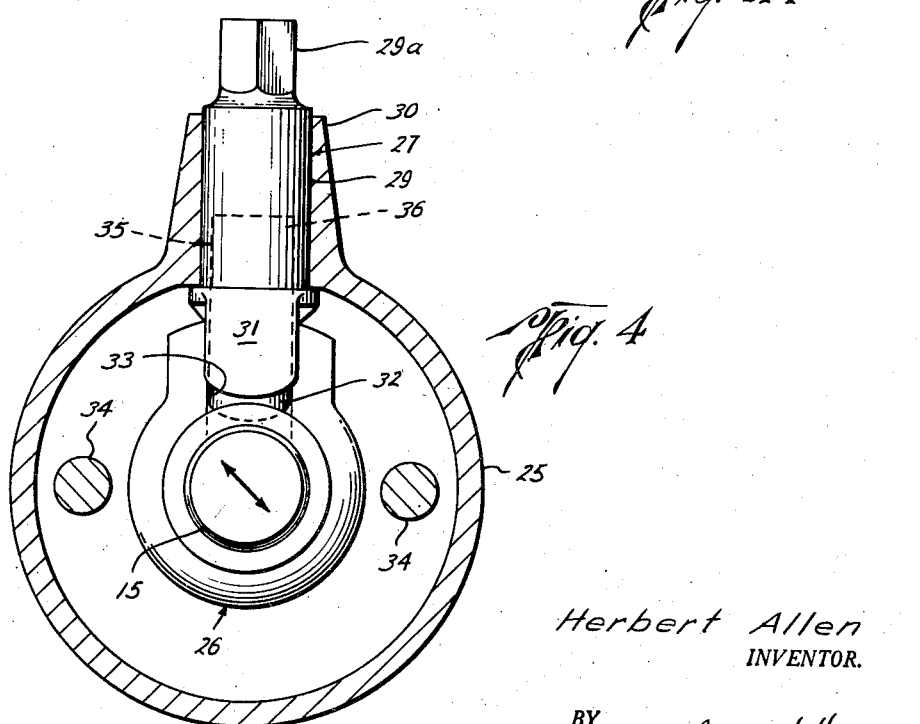
Figs. 4 and 4A are also views corresponding to Figs. 2 and 2A, but when the valve member is in the intermediate unseated position shown in Figs. 1 and 1A.
Figure 4A:
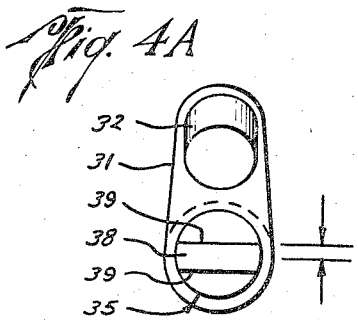

More particularly, the eccentricity of the opening 37 and the crank arm 31 are so arranged relative to one another that the stem 15 is caused to have a concomitant rotational and axial movement. Thus, as the shaft 27 is rotated from the position of Figs. 3 and 3A to the position of Figs. 5 and 5A, the stem and valve member are first lifted and then lowered as the eccentricity of the opening 37 swings from one side to the other of the axis of rotation of the shaft 27. Intermediate these two positions, the stem 15 reaches its zenith of upward axial movement when the actuating mechanism occupies the position of Figs. 4 and 4A.

Figure 1A:
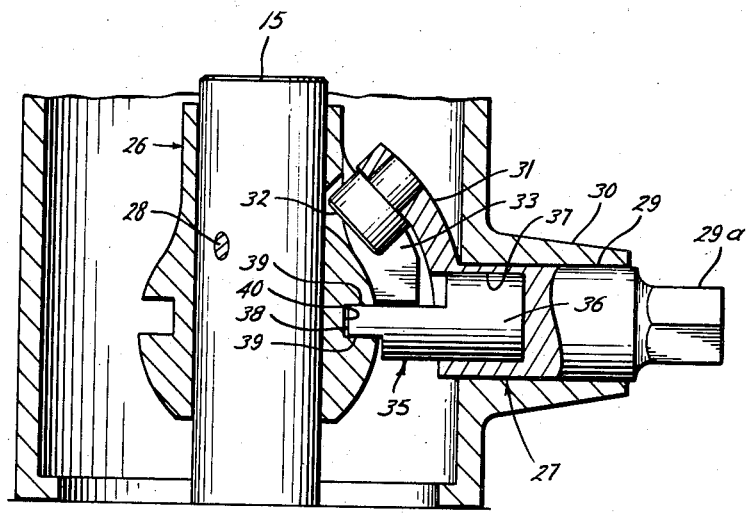
Fig. 1A is an enlarged vertical sectional view of the actuator mechanism for the valve member of Fig. 1, taken substantially along broken line 1-A—1-A of Fig. 1.
Figure 2A:
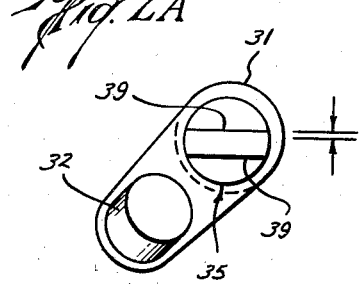
Fig. 2A is a front elevational view of the cam part of the actuating mechanism when the valve member is in the position of Fig. 2.
Figure 7:
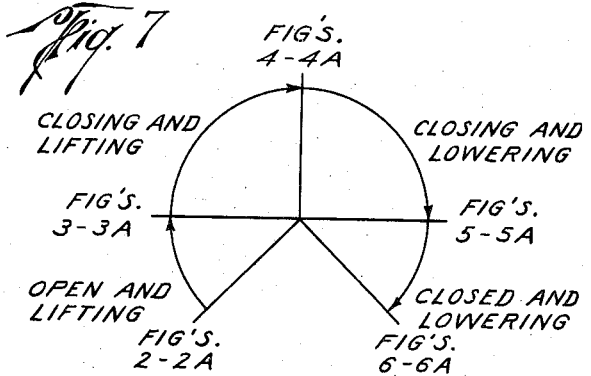
Fig. 7 is a diagrammatic illustration of the path of the actuator mechanism as it moves the valve member from the open position of Fig. 2 to the closed position of Fig. 6.

With particular reference to Fig. 1A, it will be seen that the lower ends of the portions of the follower part 26 which define the cam surfaces 33 terminate just above the upper cam surface 39 of the ledge 38 so as to permit said portions to swing over the ledge during rotation of the stem. Since this termination is also relatively adjacent the axis of rotation of the shaft 27, the cylindrical knob 32 is freed from the cam surfaces 33 during movement from the position of Figs. 2 and 2A into the position of Figs. 3 and 3A as well as during movement from the position of Figs. 5 and 5A into the position of Figs. 6 and 6A. Thus, during rotation of the shaft 27 from the position of Figs. 2 and 2A to the position of Figs. 3 and 3A, there is only axial movement of the stem and valve member. That is, as can be seen from a comparison of these figures as well as the portion of Fig. 7 marked "open and lifting," the stem and valve member remain in one rotational position as they are lifted from seated to an unseated position. During rotation of the shaft 27 from the position of Figs. 5 and 5A to the position of Figs. 6 and 6A, the stem and valve member again remain in one rotational position while being lowered from an unseated to the seated position, as indicated by that portion of Fig. 7 marked "closed and lowering." Of course, although this initial unseating and final seating of the valve member is illustrated as occurring during approximately 45° of rotation of the shaft 27, it should be understood this arrangement may be varied as desired.

In view of the foregoing, it is obvious that this actuating mechanism enables movement of the valve member in the manner desired since it first lifts the valve member, then rotates same between open and closed positions while further lifting and then lowering same, and finally lowers the valve member into seated position. With reference again to Fig. 7, this concomitant rotation and endwise or axial movement of the stem and valve member is represented by those portions marked "opening and lifting" and "opening and lowering." Obviously, movement of the valve member from the closed to the opened position involves merely a reversal of the steps above described.

In addition to enabling a desired sequence of movement for the valve member, the above-described actuator mechanism accomplishes one of the more particular objects of the present invention inasmuch as it provides surface contact over a large area between the cam and follower parts thereof for moving the stem axially. Thus, the ledge 38 of the crank member 35 is held securely within the slot 40 of the follower part 26 on the stem as the shaft 27 rotates relatively to the pin 36 of the crank member. Also, the crank arm 31 and knob 32 of the cam part 27 are operatively engageable with the follower part on the same side of the stem as is the crank member 35. This arrangement of parts permits the crank arm to be strengthened without, at the same time, enlarging the portion of the follower part 26 with which it is cooperable in rotating the stem and valve member.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve actuator mechanism for causing rotation and limited endwise movement of a stem and valve member, comprising a rotatable shaft, means connecting the shaft to the stem for rotating said stem about its axis during rotation of the shaft, a non-rotary crank member having a driving engagement with the stem for moving said stem axially, and a connection between said shaft and crank member for moving the latter in a manner to move the stem first in one and then in the opposite axial direction upon rotation of the former in one directional sense.

2. A valve actuator mechanism for causing rotation and limited endwise movement of a stem and valve member, comprising a first driving part rotatable about an axis disposed angularly with respect to the axis of the stem and having a driving engagement with said stem for rotating it about its axis during rotation of the first driving part, a second driving part having a flat cam surface in driving engagement with a complementary surface on the stem which extends transversely to the stem axis for moving said stem axially, and a connection between said first and second driving parts for moving the latter in a manner to move the stem first in one and then in the other opposite axial direction upon rotation of the former in one directional sense.

3. A valve actuator mechanism for causing rotation and limited endwise movement of a stem and valve member, comprising a rotatable driving shaft separate from the stem, a discontinuous rotary driving connection between the shaft and stem for causing interrupted rotation of the stem during continuous rotation of the shaft, a non-rotary crank member having a driving engagement with the stem for moving said stem axially, and means connecting said shaft and crank member for moving the latter in a manner to move the stem first in one and then in the opposite axial direction during rotation of the shaft in one directional sense.

4. A valve actuator mechanism for causing rotation and limited endwise movement of a stem and valve member, comprising a shaft rotatable about an axis intersecting and disposed angularly with respect to the axis of the stem, means connecting the shaft to the stem for rotating the stem about its axis during rotation of the shaft, a crank member having a flat cam surface in driving engagement with a complementary surface on the stem which extends transversely to the stem axis, and a connection between said shaft and crank member for moving the latter in a manner to move the stem first in one and then in the opposite axial direction upon rotation of the former in one directional sense.

5. A valve actuator mechanism of the character defined in claim 4, wherein the connection between the shaft and crank member comprises a pin on the latter carried by the shaft for rotation relatively thereto about an axis parallel to but spaced from the axis of rotation of the shaft.

6. A valve actuator mechanism for causing rotation and limited endwise movement of a stem and valve member, comprising a shaft rotatable about an axis intersecting and disposed angularly with respect to the axis of the stem, a discontinuous rotary driving connection between the shaft and stem for rotating the stem during continuous rotation of the shaft through only an intermediate portion of its rotative cycle, a crank member having a flat cam surface in driving engagement with a complementary surface on the stem which extends transversely to the stem axis, and a pin on the crank member carried by the shaft eccentrically of the axis of rotation of the shaft and so arranged relative to said rotary driving connection as to move stem in said opposite axial directions concomitantly with rotation of the stem.

7. A mechanical connection between a rotatably mounted shaft and a stem mounted for rotation and limited endwise movement on a common axis intersecting the rotational axis of the shaft and disposed at about 90° relative thereto, comprising a crank arm on the shaft extending angularly from the rotational axis of the shaft and drivingly engageable with the stem eccentrically of the axis of rotation thereof for rotating the stem during rotation, of the shaft, a crank member having a flat surface in driving engagement with the stem for moving it endwise along its axis, and means connecting said shaft and crank member for moving the crank member, upon rotation of the shaft in one directional sense, in a manner to move the stem first in one and then the opposite axial direction.

8. A mechanical connection of the character defined in claim 7, wherein the crank arm is drivingly engageable with the stem during only an intermediate portion of the cycle of rotation of the shaft continuously in one direction, and the flat surface of the crank member is drivingly engageable with the stem during said intermediate cycle for moving the stem in said opposite axial directions concomitantly with the rotation thereof.

9. A mechanical connection of the character defined in claim 7, wherein both the crank arm and flat surface of the crank member are drivingly engageable with the stem on its side adjacent the shaft.

10. A valve actuator mechanism for causing rotation and limited endwise movement of a stem and valve member, comprising a shaft rotatable about an axis intersecting and disposed at about 90° to the axis of the stem, spaced apart cam surfaces formed on the stem eccentrically of and extending parallel to its axis of rotation, a crank arm on the shaft extending angularly from the shaft for driving engagement between said cam surfaces, a flat cam surface formed on the stem and extending perpendicularly of the axis of rotation thereof, a crank member having a flat cam surface complementary to the flat cam surface on the stem for driving engagement therewith, and means connecting said crank member and said shaft for moving said crank member, upon rotation of said shaft in one directional sense, first in one and then in the opposite axial direction concomitantly with the rotation of the shaft.

11. A valve actuator mechanism of the character defined in claim 10, wherein said spaced apart cam surfaces terminate at their lower ends relatively adjacent to the axis of rotation of the shaft.

12. A valve actuator mechanism of the character defined in claim 10, wherein both of said spaced apart cam surfaces and said perpendicularly extending cam surfaces are formed on the same side of the stem.

13. A valve actuator mechanism of the character defined in claim 10, wherein said connecting means comprises a cylindrical opening in the shaft having its axis parallel to but spaced from the axis of rotation of the shaft, and a cylindrical pin on the crank member received within said opening for rotation relatively thereto.

No references cited.